United States Patent
Balasubramanian et al.

(10) Patent No.: US 12,177,094 B2
(45) Date of Patent: Dec. 24, 2024

(54) SYSTEM AND METHOD FOR SERVICING REQUESTS IN A DECENTRALIZED NETWORK

(71) Applicant: Bank of America Corporation, Charlotte, NC (US)

(72) Inventors: Saravanan Balasubramanian, Tamil Nadu (IN); Arul Victor Benjamin, Tamil Nadu (IN); Saurabh Uprit, Harayana (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/163,476

(22) Filed: Feb. 2, 2023

(65) Prior Publication Data

US 2024/0267306 A1    Aug. 8, 2024

(51) Int. Cl.
  *G06F 15/173*   (2006.01)
  *H04L 41/507*   (2022.01)
  *H04L 41/5074*  (2022.01)

(52) U.S. Cl.
  CPC ........ *H04L 41/5074* (2013.01); *H04L 41/507* (2013.01)

(58) Field of Classification Search
  CPC .................... H04L 41/5074; H04L 41/507
  USPC ....................................................... 709/223
  See application file for complete search history.

(56) References Cited

U.S. PATENT DOCUMENTS

| | | | |
|---|---|---|---|
| 7,742,421 B2 | 6/2010 | Bantukul et al. | |
| 7,876,698 B2 | 1/2011 | Sienel et al. | |
| 7,912,948 B2 | 3/2011 | Gkantsidis et al. | |
| 8,214,489 B2 | 7/2012 | Ballette et al. | |
| 8,219,684 B1* | 7/2012 | Dean | H04L 67/10 709/226 |
| 8,332,484 B2 | 12/2012 | Afergan et al. | |
| 8,364,758 B2 | 1/2013 | Hydrie et al. | |
| 8,606,846 B2 | 12/2013 | Czechowski, III et al. | |
| 8,612,621 B2 | 12/2013 | Wang et al. | |
| 8,732,298 B2 | 5/2014 | Shi et al. | |
| 8,949,360 B1* | 2/2015 | Jackson | H04L 51/52 709/206 |
| 9,124,586 B2 | 9/2015 | Randriamasy | |
| 9,148,388 B2 | 9/2015 | Sprague et al. | |
| 9,565,157 B2 | 2/2017 | Chhabra et al. | |

(Continued)

OTHER PUBLICATIONS

Proof of Knowledge, Wikipedia, https://en.wikipedia.org/wiki/Zero-knowledge_proof; printed Feb. 6, 2023.

(Continued)

*Primary Examiner* — Thuong Nguyen

(57) ABSTRACT

A system is configured to determine multiple sub-requests from one of service requests received from a user device. The system associates each sub-request to at least one knowledge domain. The sub-requests are transmitted to a decentralized network. In turn, the decentralized network generates one or more responses associated with each knowledge domain in each sub-request. At this stage, the system relates multiple responses corresponding to the received service request to a same identifier (i.e., a common identifier) and provide the responses related to the identifier to the user device as a single service request response.

20 Claims, 3 Drawing Sheets

(56) References Cited

U.S. PATENT DOCUMENTS

| | | | |
|---|---|---|---|
| 9,635,107 B2 | 4/2017 | Souza et al. | |
| 10,356,144 B1 | 7/2019 | Zhang et al. | |
| 10,476,984 B2 | 11/2019 | Slocombe et al. | |
| 10,574,586 B2 | 2/2020 | Chen | |
| 11,477,272 B2 | 10/2022 | Arolovitch | |
| 2002/0073086 A1* | 6/2002 | Thompson | H04L 41/34 |
| 2002/0169842 A1* | 11/2002 | Christensen | H04L 67/14 |
| | | | 709/206 |
| 2005/0114324 A1* | 5/2005 | Mayer | G06F 16/9538 |
| 2009/0100128 A1 | 4/2009 | Czechowski, III et al. | |
| 2009/0144417 A1 | 6/2009 | Kisel et al. | |
| 2011/0029301 A1* | 2/2011 | Han | G10L 15/24 |
| | | | 704/9 |
| 2011/0040749 A1* | 2/2011 | Ceri | G06F 16/9535 |
| | | | 707/723 |
| 2012/0278379 A1 | 11/2012 | Hu et al. | |
| 2012/0297025 A1* | 11/2012 | Zeng | G06F 16/951 |
| | | | 709/217 |
| 2013/0254415 A1 | 9/2013 | Fullen et al. | |
| 2014/0181203 A1* | 6/2014 | Hegarty | H04W 8/08 |
| | | | 709/204 |
| 2014/0215059 A1 | 7/2014 | Lezaun et al. | |
| 2016/0012107 A1* | 1/2016 | Asaad | G06F 16/24569 |
| | | | 707/764 |
| 2016/0218921 A1* | 7/2016 | Christensen | H04L 67/10 |
| 2017/0126730 A1* | 5/2017 | Oberheide | H04L 63/1483 |
| 2018/0343272 A1* | 11/2018 | Khalil | G06F 21/56 |
| 2019/0163785 A1* | 5/2019 | Ramachandra | G06F 16/24575 |
| 2019/0187569 A1* | 6/2019 | Ypma | G03F 7/70525 |
| 2021/0342432 A1* | 11/2021 | Goldwerger | G06F 21/32 |
| 2022/0130526 A1* | 4/2022 | Slattery | G06Q 30/0201 |

OTHER PUBLICATIONS

Atkinson, David, Preparing to Build on Holochain; https://holo.host/wp-content/uploads/holochain-building.pdf; printed Feb. 6, 2023.

* cited by examiner

SYSTEM AND METHOD FOR SERVICING REQUESTS IN A DECENTRALIZED NETWORK

TECHNICAL FIELD

The present disclosure relates generally to network processing, and more specifically to a system and method for servicing requests in a decentralized network.

BACKGROUND

A user attempting to receive responses associated with multiple knowledge domains from a server is required to create individual service requests for each knowledge domain. For example, to obtain responses associated with two knowledge domains, the user generates multiple, serial, requests. For example, the user generates a first service request corresponding to a first knowledge domain. Once the first service request is answered, the user generates a second service request corresponding to a second knowledge domain. This process inefficiently consumes valuable networking and processing resources.

SUMMARY OF THE DISCLOSURE

In one or more embodiments, a user attempting to receive responses associated with multiple knowledge domains from a server may generate a complex service request asking for a complex answer that includes responses from two or more knowledge domains. For example, the user may generate a single service request including questions corresponding to a first knowledge domain and a second knowledge domain. The single service request may be answered in a complex response including responses associated with the first knowledge domain and the second knowledge domain. In some embodiments, the user receives accurate responses because each response is provided by a component or device (hereinafter referred to as a node) configured to provide expert responses in at least one of the domains included in the service request.

A system and method described herein are configured to provide the complex response (i.e., a response associated with multiple knowledge domains) to the user while maximizing memory use and improving processing speed of a server by using nodes in a decentralized network to create knowledge-specific responses. In the decentralized network, multiple nodes may be configured to provide expert responses associated with a specific knowledge domain. In a single node, each knowledge domain may be rated with a score that indicates a level of expertise of that node in a specific knowledge domain. The scores may be shared among all nodes in the decentralized network to provide all nodes with sufficient information to route individual aspects of the single service request to nodes with an appropriately high score for a specific knowledge domain in the decentralized network.

The system and method described herein are integrated into a practical application of generating a single knowledge-accurate response to a service request including multiple knowledge domains. In this regard, the system and method are integrated into a practical application of providing the knowledge accurate responses to a user device while maximizing memory use of the server and the nodes in the decentralized network. In particular, nodes with higher scores are selected to provide responses associated with a specific knowledge domain in the decentralized network. As a result, multiple nodes may specialize in different knowledge domains. A single node is not required to provide expert responses for more than a single knowledge domain. The decentralized network may be a peer-to-peer decentralized network (i.e., decentralized protocols involving Holo-Chain and the like) configured to provide a given node with knowledge scores of the rest of the nodes in the decentralized network. As a result, the memory use of the server is maximized because the server is not required to include a single knowledge repository including multiple knowledge domains. Instead, the server is configured to reach for knowledge-specific responses in the decentralized network. Further, the memory use in the nodes of the decentralized network is maximized because the nodes may focus on becoming experts of a specific knowledge domain instead of attempting to store knowledge from multiple knowledge domains.

In addition, the system and method described herein are integrated into a practical application of generating the single knowledge-accurate response to the service request including multiple knowledge domains while improving processing speed of the server. In particular, upon detecting nodes with higher scores for each of the knowledge domains included in the service request, the system and method compile all responses associated with the single service request. The system and method provide one complex response including all the compiled responses associated with all the knowledge domains included in the service request to the user device. The processing speed of the server is improved because the server is not required to ask each node in the decentralized network for their knowledge expertise. Instead, the server may provide multiple sub-requests of the service request to one node in the decentralized network. This node may route the sub-requests to specific nodes configured to provide responses associated with the sub-request. Each response is compiled and received by the server under a same response identifier. At this point, the system and method provide one complex response including all the compiled responses associated with all the knowledge domains included in the service request to the user device. As a result, the processing speed of the server is improved because the server is not required to search for a single knowledge repository including multiple knowledge domains.

The system and method described herein are integrated into a practical application of reducing an overall amount of network traffic due to sending a single complex service request instead of sending multiple, serial service requests. This reduces the traffic on the network and helps alleviate network bottlenecks that could otherwise occur.

These practical applications may lead to a technical advantage of improving response speed and accuracy to the user device.

In one or more embodiments, the system includes an apparatus, such as a server, that is operably connected to multiple nodes in the decentralized network. The system may include receiving, by the server, a service request to provide multiple responses associated with one or more knowledge domains. The service request may be associated with a request identifier. The server may parse the service request into multiple sub-requests. A first sub-request may be associated with a first knowledge domain and a second sub-request may be associated with a second knowledge domain. The server may communicate the first sub-request associated with the first knowledge domain and the second sub-request associated with the second knowledge domain to a decentralized network comprising multiple nodes. In some embodiments, the first node of the multiple nodes may receive the first sub-request and the second sub-request. The first node may be configured to provide a first response corresponding to the first knowledge domain. The first node may communicate the second sub-request to a second node of the plurality of nodes. The second node may be configured to provide a second response corresponding to the second knowledge domain. The first node and the second node may provide the first response and the second response to a response aggregator, respectively. In turn, the response aggregator may relate the first response and the second response to the request identifier associated with the service request. At this stage, the server may output the first response and the second response to a user device in conjunction with the request identifier associated with the service request.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
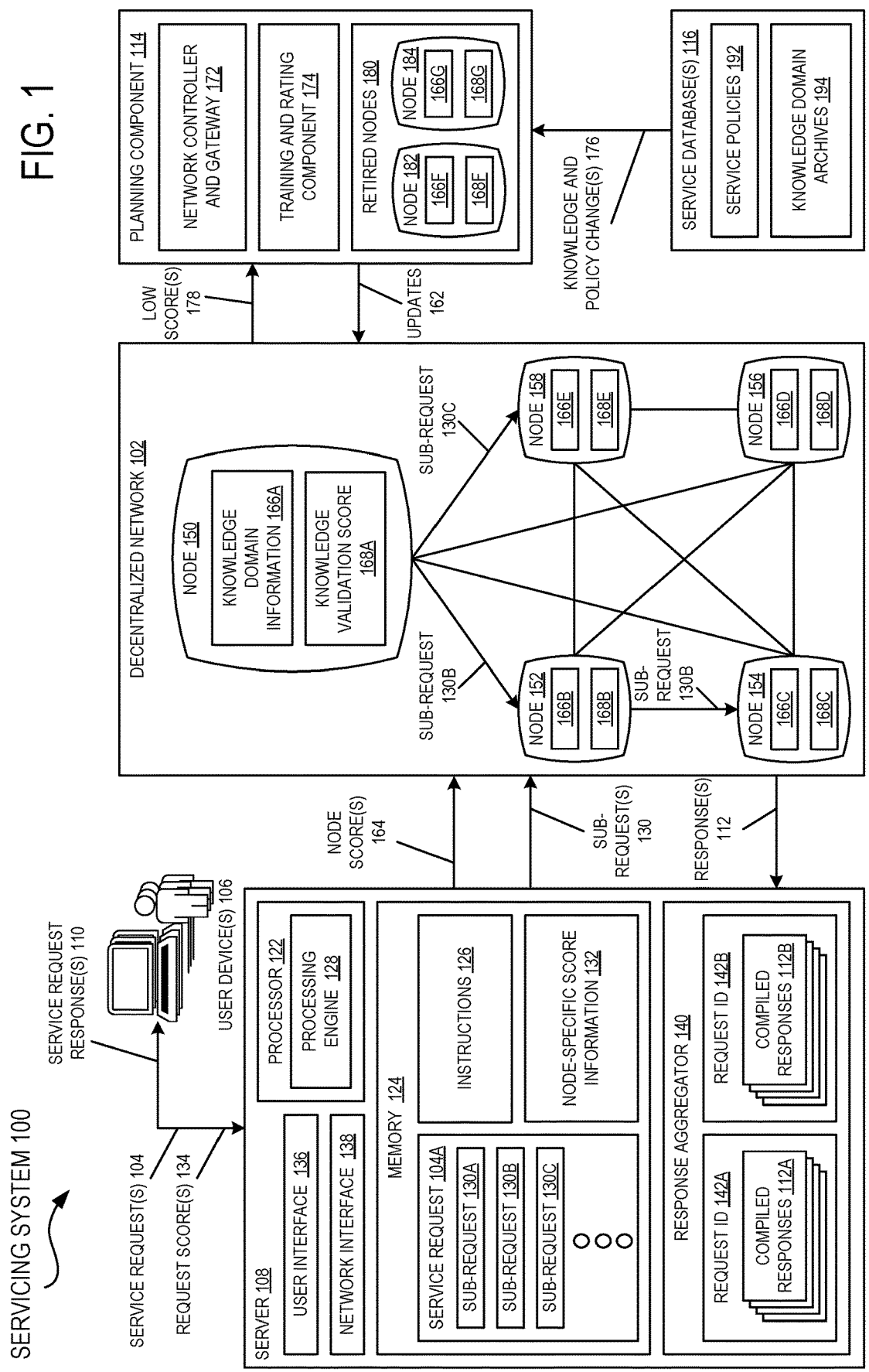
FIG. 1 illustrates an example servicing system in accordance with one or more embodiments.
Figure 2:
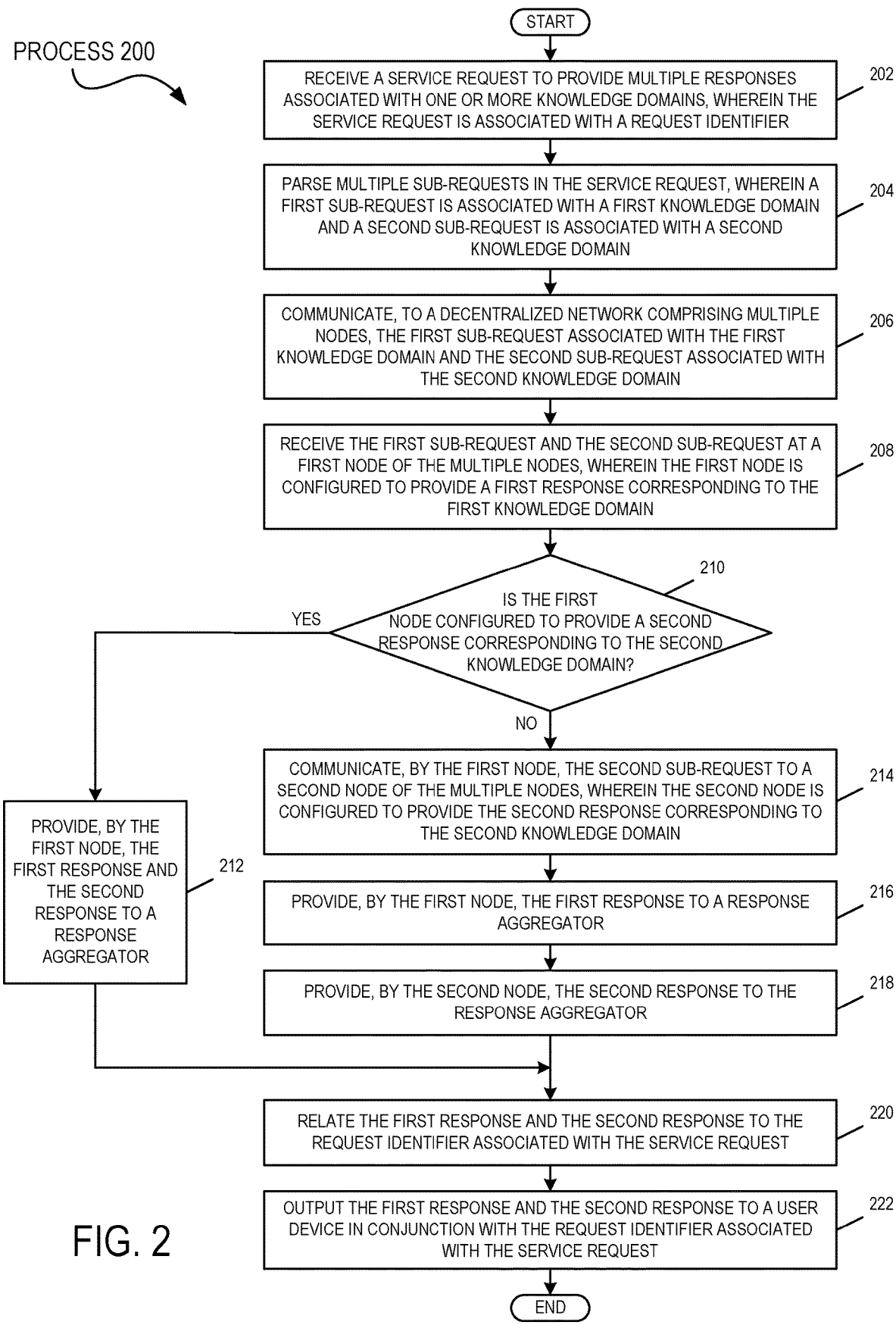
FIG. 2 illustrates an example flowchart of a method for servicing a service request in accordance with one or more embodiments.
Figure 3:
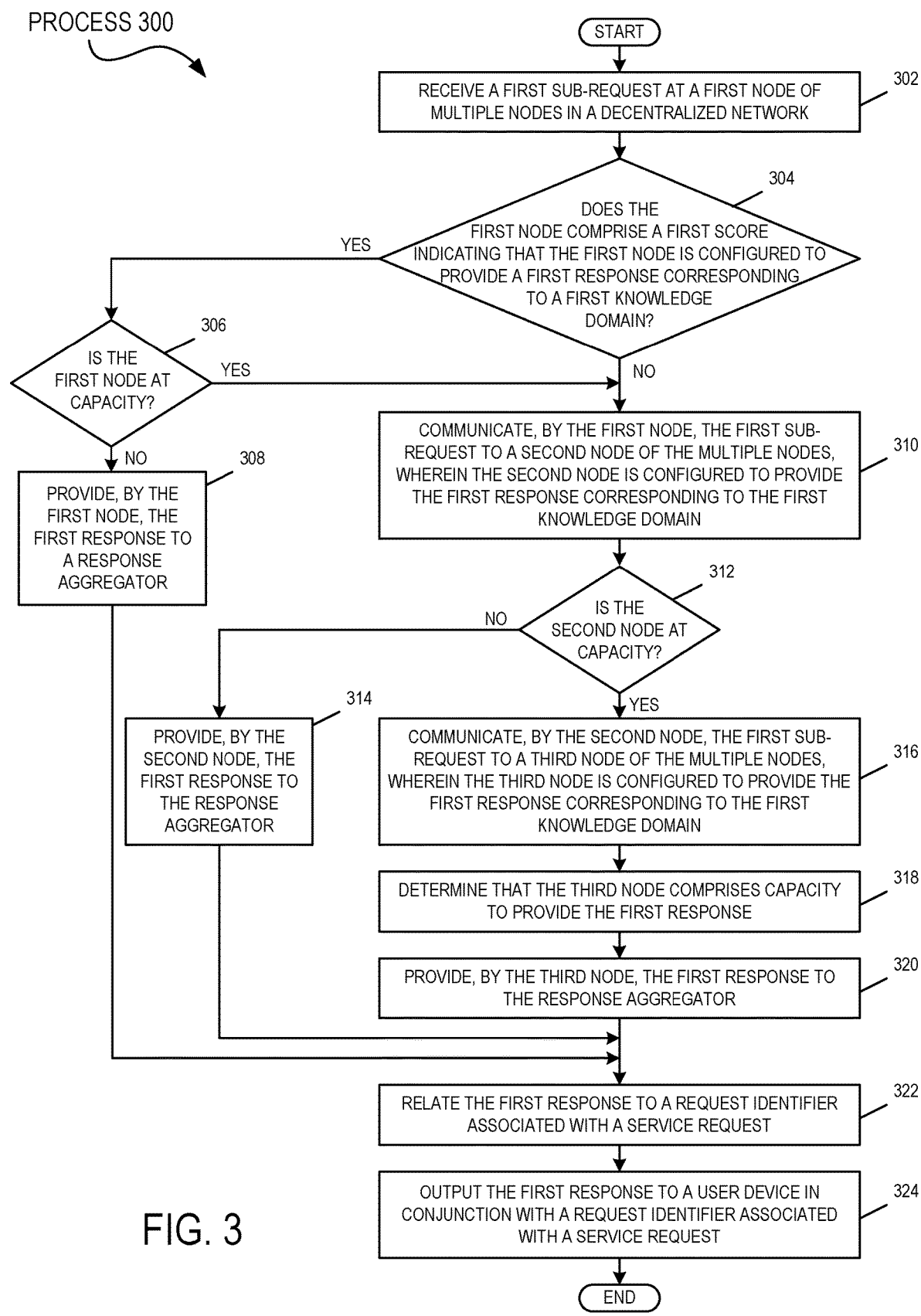
FIG. 3 illustrates an example flowchart of a method for selecting decentralized network nodes configured to provide knowledge-specific responses in accordance with one or more embodiments.

As described above, previous technologies fail to provide efficient and reliable solutions to service complex requests directed to multiple knowledge domains. This disclosure provides various systems and methods to provide accurate and knowledge-specific responses to complex service requests. FIG. 1 illustrates a servicing system 100 configured to service a request using a decentralized network 102. FIG. 2 illustrates a process 200 to service a request using the servicing system 100 of FIG. 1. FIG. 3 illustrates a process 300 to provide knowledge-specific responses using the decentralized network 102.

Example System for Responding to Service Requests

FIG. 1 illustrates a servicing system 100 that is configured to service complex requests (hereinafter referred to as service requests 104) using a decentralized network 102. In one or more embodiments, the servicing system 100 includes one or more user device(s) 106 configured to submit the service requests 104 to a server 108. The server 108 may be configured to identify multiple knowledge domains associated with each service request 104 and provide 104 to the user device 106 a service request response 110 per service request. Each service request response 110 may include responses 112 corresponding to each of the knowledge domains identified by the server 108. The server 108 may be communicatively coupled to the decentralized network 102. The decentralized network 102 may be a peer-to-peer decentralized network (e.g., decentralized protocols involving HoloChain and the like) configured to provide to the server 108 responses associated with specific knowledge domains. The server 108 may be configured to compile the responses 112 from the decentralized network 102 under a common identifier (i.e., a common ID) and make the compiled responses available to the user device 106 under a single service request response 110.

In some embodiments, the servicing system 100 further comprises a planning component 114 communicatively coupled to the decentralized network 102 and one or mode service databases 116. The planning component 114 may be configured to update knowledge domains in components (i.e., electronic devices) of the decentralized network 102. In other embodiments, the servicing system 100 may not have all of the components listed and/or may have other elements instead of, or in addition to, those listed above.

In one or more embodiments, the server 108 comprises a processor 122 in signal communication with a memory 124. The memory 124 stores software instructions 126 that when executed by the processor 122, cause the processor 122 to perform one or more functions described herein. For example, when the software instructions 126 are executed, the processor 122 executes a processing engine 128 to: 1) determine multiple sub-requests (i.e., one or more sub-requests 130) from one of the received service requests 104; 2) associate each sub-request 130 to at least one knowledge domain in decentralized network 102; 3) transmit the sub-requests 130 to the decentralized network 102; 4) receive one or more responses 112 associated with each knowledge domain from the decentralized network 102; 5) relate multiple responses 112 corresponding to the received service request 104 to a same identifier (i.e., a common identifier or common ID); and 6) provide the responses related to the identifier to the user device 106 as a single service request response 110. The servicing system 100 may be configured as shown, or in any other suitable configuration.

System Components

User Device

The user device 106 may be hardware configured to create, transmit, and/or receive information. The user device 106 may be configured to receive inputs from a user, process the inputs, and generate data information or command information in response. The data information may include documents or files generated using a graphical user interface (GUI). The command information may include input selections/commands triggered by a user using a peripheral component (i.e., a keyboard) or an integrated input system (i.e., a touchscreen displaying the GUI). The user device 106 may be communicatively coupled to the server 108 via a network connection (i.e., user interface 136 in the server 108). The user device 106 may transmit and receive data information, command information, or a combination of both to and from the server 108 via the user interface 136. In one or more embodiments, the user device 106 is configured to transmit service requests 104 to the server 108. In some embodiments, the user device 106 is configured to receive at least one service request response 110 for each service request 104 transmitted to the server 108. In other embodiments, the user device 106 is configured to transmit request scores 134 in which the user indicates a perceived knowledge capacity of a given node about at least one of the knowledge domains included in the service request responses 110. The service requests 104, the service request responses 110, and the request scores 134 are explained in further detail below in conjunction with the operational flow of the servicing system 100 described in FIG. 1 and process 200 described in FIG. 2.

Server

The server 108 is generally any device that is configured to process data and communicate with computing devices (e.g., user device 106), databases, systems, and the like, via one or more interfaces (i.e., user interface 136). The server 108 is generally configured to oversee operations of the processing engine 128. The operations of the processing engine 128 are described further below in conjunction with the operational flow of the servicing system 100 described in FIG. 1 and process 200 described in FIG. 2.

The server 108 comprises processor 122 in signal communication with a network interface 138, the user interface 136, and the memory 124. The server 108 may be configured as shown, or in any other configuration.

The processor 122 comprises one or more processors operably coupled to the memory 124. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to, and in signal communication with, the network interface 138, the user interface 136, and the memory 124. The one or more processors 122 are configured to process data and may be implemented in hardware or software. For example, the processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches the software instructions 126 from memory and executes them by directing the coordinated operations of the ALU, registers and other components. The one or more processors 122 are configured to implement various instructions. For example, the one or more processors 122 are configured to execute the software instructions 126 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the user interface 136 and the network interface 138 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The user interface 136 and the network interface 138 may be configured to support any suitable type of communication protocol as would be appreciated by one of ordinary skill in the art.

In one or more embodiments, the user interface 136 and the network interface 138 may be configured to enable wired and/or wireless communications. The user interface 136 and the network interface 138 may be configured to communicate data between the server 108 and other user devices (i.e., the user device 106), network devices (i.e., the decentralized network 102), systems, or domain(s). For example, the network interface 138 may comprise a WIFI interface, a LAN interface, a WAN interface, a modem, a switch, or a router. The processor 122 is configured to send and receive data using the user interface 136 and the network interface 138. The user interface 136 and the network interface 138 may be configured to use any suitable type of communication protocol.

The memory 124 may be volatile or non-volatile and may comprise a read-only memory (ROM), random-access memory (RAM), ternary content-addressable memory (TCAM), dynamic random-access memory (DRAM), and static random-access memory (SRAM). The memory 124 may be implemented using one or more disks, tape drives, solid-state drives, and/or the like. The memory 124 is operable to store the software instructions 126, multiple service requests 104 (represented by a first service request 104A), multiple sub-requests 130 (further represented by sub-requests 130A-130C), node-specific score information 132, and/or any other data or instructions. The software instructions 126 may comprise any suitable set of instructions, logic, rules, or code operable to execute the processor 122.

In one or more embodiments, the server 108 includes a response aggregator 140 configured to receive and compile the responses 112 received from the decentralized network 102. The response aggregator 140 may be implemented by, or an extension of, the processor 122. In some embodiments, the response aggregator 140 may be configured to identify a specific knowledge domain for each of the responses 112. Upon receiving the responses 112, the response aggregator 140 relates some of the responses 112 associated with a specific service request 104 via a request identifier assigned by the server 108. In the example of FIG. 1, the responses 112 are shown to be separated into first compiled responses 112A related to a first response ID 142A and second compiled responses 112B related to a first response ID 142B.

In one example, the first compiled responses 112A may be associated with a first service request (i.e., the first service request 104A). In this case, each of the first compiled responses 112A may correspond to the one or more sub-requests 130A-130C. As described above, the response aggregator 140 may compile any responses 112 received from the decentralized network 102 in response to the sub-requests 130A-130C. After the response aggregator 140 compiles and relates the first compiled responses 112A under the first request ID 142A, the server 108 may provide a first single service request response 110 to a first user device 106 via the user interface 136. In this regard, the first single service request response 110 comprises the first compiled responses 112A which in turn comprise knowledge-specific responses to the sub-requests 130A-130C in the first service request 104A.

In the same example, the second compiled responses 112B may be associated with a second service request (i.e., another specific service request not shown; similar in concept to the first service request 104A) of the one or more service requests 104. The second service request may be submitted to the server 108 via a second user device 106. In this case, after the response aggregator 140 compiles and relates the second compiled responses 112B under the second request ID 142B, the server 108 may provide a second single service request response 110 to the second user device 106 via the user interface 136. In this regard, the second single service request response 110 comprises the second compiled responses 112B which in turn comprise knowledge-specific responses to other sub-requests (not shown; similar in concept to the sub-requests 130A-130C) in the second service request.

Decentralized Network

In one or more embodiments, the decentralized network 102 is a peer-to-peer networking protocol that enables development of serverless applications. The decentralized network 102 may include multiple electronic components or devices (i.e., nodes 150-158) comprising specific node data. The nodes 150-158 may not be required to store or validate all data in the decentralized network 102. Instead, validation of each node's data may be obtained via peer accountability. The peer accountability is explained in further detail below in conjunction with the operational flow of the servicing system 100 described in FIG. 1 and process 300 described in FIG. 3.

In some embodiments, the nodes 150-158 may include only their own data and a reference to all other data in the decentralized network 102 in accordance with policies (and/or rules) preestablished by the server 108. These policies may determine how the nodes 150-158 interact with each other and the server 108. The policies may be updated dynamically with additional data received as updates 162 via the planning component 114. The updates 162 may be triggered by a perceived lack of knowledge level in the nodes 150-158. A perceived knowledge level in the nodes 150-158 may be identified via node scores 164 received from the server 108. The node scores 164 are explained in further detail below in conjunction with the operational flow of the servicing system 100 described in FIG. 1 and process 300 described in FIG. 3.

In one or more embodiments, each node (i.e., out of nodes 150-158) in the decentralized network 102 includes knowledge-specific information and information associated with peer accountability and a perceived knowledge level. Specifically, referencing the node 150 as an example, each node includes knowledge domain information 166A including the knowledge-specific information and a knowledge validation score 168A including the peer accountability and perceived knowledge level. The knowledge domain information 166A may include expert information corresponding to at least one knowledge domain. The knowledge domain information 166A may be information obtained via updates 162 over a predetermined period of time. The knowledge domain information 166A may be disposed in a memory or storage (not shown) in the node 150. The node 150 may be configured to receive one or more of the sub-requests 130. Upon receiving the sub-requests 130, the node 150 may be configured to determine whether any of the sub-requests 130 corresponds to the knowledge information included in the knowledge domain information 166A. If the node 150 determines that any of the sub-requests 130 corresponds to the knowledge information included in the knowledge domain information 166A, the node 150 is configured to provide a response to the specific sub-request 130. If the node 150 determines that the sub-requests 130 do not correspond to the knowledge information included in the knowledge domain information 166A, the node 150 forwards the sub-requests 130 to one of the other nodes 152-158 in the decentralized network 102. The node 150 may forward the sub-requests 130 to specific nodes in the decentralized network 102 that were previously identified to be configured to provide responses to specific knowledge domains. For example, the node 150 may determine that some sub-requests 130 may be responded to by the node 152 while the rest of the sub-requests 130 may be responded to by the node 158.

In some embodiments, the knowledge validation score 168A may indicate the peer accountability and perceived knowledge level corresponding to the node 150. The knowledge validation score 168A may include a score for each knowledge domain stored in the node 150. The scores may not be the same for all knowledge domain. For example, a first knowledge domain may have a first score and a second knowledge domain may have a second score. In this regard, the node 150 may be considered to be an expert in the first knowledge domain if the first score is above a predetermined threshold. The node 150 may be configured to respond to sub-requests 130 corresponding to a specific knowledge domain if the node 150 is an expert in the specific knowledge domain.

In other embodiments, the node 150 includes a processor (not shown) configured to provide responses corresponding to specific knowledge domain. The processor in the node 150 may be configured to provide responses directly to the response aggregator 140. Further, the processor of the node 150 may be configured to route any unanswered sub-requests to one of the other nodes 152-158 in accordance with one or more policies governing the decentralized network 102.

In the example of FIG. 1, the decentralized network 102 includes five nodes 150-158. However, additional nodes or fewer nodes may be included. In some embodiments, each of the nodes 150-158 includes a corresponding knowledge domain information 166A-166E and a corresponding knowledge validation score 168A-168E. In the decentralized network 102 of FIG. 1, the node 150 includes the knowledge domain information 166A and the knowledge validation score 168A; the node 152 includes the knowledge domain information 166B and the knowledge validation score 168B; the node 154 includes the knowledge domain information 166C and the knowledge validation score 168C; the node 156 includes the knowledge domain information 166D and the knowledge validation score 168D; and the node 158 includes the knowledge domain information 166E and the knowledge validation score 168E.

Planning Component

In one or more embodiments, the planning component 114 is hardware and/or software configured to evaluate the knowledge validation scores 168A-168E in the decentralized network 102 and provide the updates 162 to the decentralized network 102. The planning component 114 may include a network controller and gateway 172 configured to determine thresholds associated with one or more rules and/or policies in the decentralized network 102. The network controller and gateway 172 may determine the thresholds based on rules and/or policies generated by a training and rating component 174. The training and rating component 174 may be configured to evaluate whether the nodes 150-158 in the decentralized network 102 include information such that at least one of the nodes 150-158 is an expert node in each of the knowledge domains included in the decentralized network 102. To this end, the planning component 114 receives one or more low scores 178 corresponding to specific nodes (i.e., nodes 182-184) of the decentralized network 102. The low scores 178 may be from knowledge validation scores (i.e., knowledge validation scores 168F-168G in the nodes 182-184, respectively) that are identified to be below a predetermined threshold determined by the network controller and gateway 172. The planning component 114 includes retired nodes 180. The retired nodes 180 are nodes that received corresponding low scores 178 in the past. In the example of FIG. 1, the retired nodes 180 include the node 182 including a knowledge domain information 166F and the knowledge validation score 168F and the node 184 including a knowledge domain information 166E and the knowledge validation score 168E.

Service Databases

In one or more embodiments, the service databases 116 are hardware configured to store information that is set up for easy access, management, and updating. The service databases 116 may store aggregations of data records or files that contain information, such as service policies 192 and knowledge domain archives 194. The service databases 116 may be used to store, maintain, and access data. The service databases 116 may be configured to collect information on the server 108, each of the nodes 150-158 in the decentralized network 102, and the planning component 114. This information is gathered in one place to be observed and analyzed. In the example of FIG. 1, the service databases 116 may include service policies 192 and knowledge domain archives 194. The service policies 192 may be information commanding rules and/or operations of the decentralized network 102. The service policies 192 may be updated dynamically over time. Further, the knowledge domain archives 194 may be information Operational Flow of the Servicing System Parsing One or More Service Requests from at Least One User Device The operational flow may begin with at least one user device 106 configured to submit at least one service request 104 to the server 108. In the operational flow of FIG. 1, the service request 104A may be a request for information from one or more knowledge domains. The service request 104A may be a written and/or an oral request.

In one or more embodiments, the server 108 receives the service request 104A from the user device 106 via the user interface 136. Upon receiving the service request 104A, the server 108 identifies the multiple knowledge domains in the service request 104A. At this stage, the server 108 parses the service request 104A to determine one or more sub-requests 130 for each knowledge domain identified in the service request 104. The server 108 may generate a request ID 142A to associate with the service request 104A.

In some embodiments, upon receiving the service request 104A, the server 108 parses the service request 104A to determine one or more sub-requests 130 in the service request 104. The server 108 may generate a request ID 142A to associate with the service request 104A and the one or more sub-requests 130. In this case, the nodes 150-158 in the decentralized network 102 may identify that the one or more sub-requests 130 in the service request 104A seek certain kinds of information (i.e., information associated with specific knowledge domains).

In the example of FIG. 1, the server 108 identifies at least three sub-requests 130A-130C. While FIG. 1 shows three sub-requests, greater or fewer sub-requests 130 may be parsed from any given service request 104. In service request 104A, a first sub-request 130A may be associated with a first knowledge domain, a second sub-request 130B may be associated with a second knowledge domain, and a third sub-request 130C may be associated with a third knowledge domain.

After the sub-requests 130A-130C are parsed, the server 108 transmits the sub-requests 130A-130C to the decentralized network 102.

Routing One or More Sub-Requests in the Decentralized Network

The sub-requests 130A-130C are received at one of the nodes 150-158 in the decentralized network 102. In the example of FIG. 1, the sub-requests 130A-130C are transmitted to the node 150. Upon receiving the sub-requests 130A-130C, the node 150 determines whether the node 150 is configured to respond to knowledge-specific requests associated with the first knowledge domain. The node 150 determines that the knowledge domain information 166A includes the first domain information. After determining that the knowledge domain information 166A includes the first domain information, the node determines whether the knowledge validation score 168A meets a predetermined threshold to be considered an expert in the first knowledge domain. The node 150 is determined to be configured to respond to the first sub-request 130A if the node 150 determines that the knowledge domain information 166A includes the first domain information and that the knowledge validation score 168A meets a predetermined threshold to be considered an expert in the first knowledge domain.

The node 150 makes the same determination for the second sub-request 130B and the third sub-request 130C. In the example of FIG. 1, the node 150 determines that the node 150 is not configured to respond to the second sub-request 130B or the third sub-request 130C. As a result, the node 150 identifies other nodes in the decentralized network 102 that have been previously identified to be experts in the second knowledge domain and the third knowledge domain. In this case, the node 150 determines that the node 152 is an expert in the second knowledge domain. Further, the node 150 determines that the node 158 is an expert in the third knowledge domain. In turn, the node 150 forwards the second sub-request 130B to the node 152 and the third sub-request 130C to the node 158.

The second sub-request 130B is received at the node 152. At this stage, the node 152 confirms whether the knowledge domain information 166B includes the second domain information and that the knowledge validation score 168B meets the predetermined threshold to be considered an expert in the second knowledge domain. In the operational flow of FIG. 1, the node 152 determines that the node 152 is not configured to respond to the second sub-request 130B. The node 152 identifies other nodes in the decentralized network 102 that have been previously identified to be experts in the second knowledge domain. In this case, the node 152 determines that the node 154 is an expert in the second knowledge domain. As a result the node 152 forwards the second sub-request 130B to the node 154.

The second sub-request 130B is received at the node 154. At this stage, the node 154 confirms that the knowledge domain information 166C includes the second domain information and that the knowledge validation score 168C meets the predetermined threshold to be considered an expert in the second knowledge domain. As a result, the node 154 determines that the node 154 is configured to respond to the second sub-request 130B.

The third sub-request 130C is received at the node 158. At this stage, the node 158 confirms that the knowledge domain information 166E includes the third domain information and that the knowledge validation score 168E meets the predetermined threshold to be considered an expert in the third knowledge domain. As a result, the node 158 determines that the node 158 is configured to respond to the third sub-request 130C.

The node 150, the node 154, and the node 158 provide responses 112 to the response aggregator 140. In the operational flow of FIG. 1, the response aggregator 140 relates a first response 112 from the node 150, a second response 112 from the node 154, and a third response 112 from the node 158 to the request ID 142A associated with the service request 104A.

Aggregating Responses from the Nodes

In the example of FIG. 1, the responses 112 are received from each node in the response aggregator 140 via the network interface 138. Certain responses 112 may be provided to the response aggregator 140 faster than others. In some embodiments, each response 112 is given an order to match a respective sub-request 130. For example, the response aggregator 140 may receive the second response 112 before the third response, which in turn may be received before the first response 112.

The response aggregator 140 may compile the responses while assigning a place position to each response 112 during compilation. The place positions may be the order in which the responses 112 are presented to the user device 106 in the service request response 110. In the aforementioned example, the response aggregator 140 may assign a first place position to the first response 112, a second place position to the second response 112, and a third place position to the third response 112.

During compilation, the first response 112, the second response 112, and the third response 112 are compiled under the first compiled responses 112A related to request ID 142A. As described above, request ID 142A is a request identifier generated by the server 108 to associate the service request 104A to the sub-requests 130A-130C.

Providing at Least One Service Request Response to the at Least One User Device

The server 108 provides the service request response 110 to the user device 106. The service request response 110 includes all the first compiled responses 112A associated with the request ID 142A. The service request response 110 may be a visual response, an audio response, or a combination of both to the user device 106. In one example, the service request response 110 may be displayed on a display device of the user device 106. In another example, the service request response 110 may be presented over a speaker device (not shown) of the user device 106.

Scoring the Nodes in the Decentralized Network

After receiving the service request response 110, the user device 106 is prompted to provide one or more request scores 134 to the server 108. The server 108 may correlate the request scores 134 to each of the nodes that provided the first compiled responses 112A. In the operational flow of FIG. 1, the request scores 134 are correlated to the node 150, the node 154, and the node 158 in the node-specific score information 132. The node-specific score information 132 may be a matrix associating one or more of the first compiled responses 112A to individual scores from the request scores 134.

For example, the user device 106 may be prompted to provide four different request scores 134: a first request score corresponding to a first response associated with the first knowledge domain; a second request score corresponding to a second response associated with the second knowledge domain; a third request score corresponding to a third response associated with the third knowledge domain; and a fourth request score corresponding to an overall user experience communicating with the server 108. In the node-specific score information 132, the first request score is assigned to the node 150, the second request score is assigned to the node 154, and the third request score is assigned to the node 158.

In this example, node scores 164 are provided from the server 108 to the decentralized network 102. The nodes scores 164 may include new scores for the node 150, the node 154, and the node 158. These node scores 164 are used to update the knowledge validation score 168A, the knowledge validation score 168B, and the knowledge validation score 168C in the node 150, the node 154, and the node 158, respectively.

Updating the Nodes in the Decentralized Network

As described above, the service databases 116 may provide knowledge and policy changes 176 to the training and rating component 174 in the planning component 114. The training and rating component 174 may prepare one or more updates 162 for one, many, or all the nodes 150-158. The updates 162 may include changes to the service policies 192 that regulate the peer-to-peer behavior of the decentralized network 102. Further, the updates 162 may include changes to specific knowledge domains for one or more nodes. For example, the updates 162 may include knowledge domain changes for the first knowledge domain in the knowledge domain information 166A and the third knowledge domain in the knowledge domain information 166E without including knowledge domain changes for the second knowledge domain in the knowledge domain information 166C.

Example Processes

FIGS. 2 and 3 illustrate respective example flowcharts of a process 200 and a process 300 in accordance to one or more embodiments. Modifications, additions, or omissions may be made to the processes 200 and 300. The processes 200 and 300 may include more, fewer, or other operations than those shown below. For example, operations may be performed in parallel or in any suitable order. While at times discussed as the server 108, processor 122, processing engine 124, the nodes 150-158 of the decentralized network 102, or components of any of thereof performing operations described in the operations, any suitable system or components of the servicing system 100 may perform one or more operations of the processes 200 and 300. For example, one or more operations of processes 200 or 300 may be implemented, at least in part, in the form of software instructions 126 of FIG. 1, stored on non-transitory, tangible, machine-readable media (e.g., memory 124 of FIG. 1) that when run by one or more processors (e.g., processor 122 of FIG. 1) may cause the one or more processors to perform operations described in operations 202-222 or operations 302-326.

Example Process to Service a Service Request

FIG. 2 illustrates an example flowchart of a process 200 to service one or more the service requests 104 received from at least one user device 106 in accordance to one or more embodiments.

The process 200 starts at operation 202, where the server 108 receives a service request 104 to provide multiple responses associated with one or more knowledge domains. The service request 104 is associated with a request identifier (i.e., the request ID 142A). For example, the server 108 may receive a first service request 104A and generate the request ID 142A that corresponds to the first service request 104A.

At operation 204, the server 108 parses multiple sub-requests 130 in the service request 104A. A first sub-request 130A is associated with a first knowledge domain and a second sub-request 130B is associated with a second knowledge domain. Staying with the example of FIG. 1, the server 108 may identify different knowledge domains in the first service request 104A and determine multiple sub-requests corresponding one or more knowledge domains.

At operation 206, the server 108 communicates, to the decentralized network 102 comprising multiple nodes 150-158, the first sub-request 130A associated with the first knowledge domain and the second sub-request 130B associated with the second knowledge domain. As described above, the first sub-request 130A and the second sub-request 1030B may be transferred to the decentralized network 102 via the network interface 138.

At operation 208, the decentralized network 102 receive the first sub-request 130A and the second sub-request 130B at a first node 150 of the multiple nodes 150-158. The first node 150 may be configured to provide a first response (i.e., one of responses 112) corresponding to the first knowledge domain. To determine that the first node 150 is configured to respond to the first sub-request 130A, the first node 150 may determine that the first knowledge domain is included in the first knowledge domain information 166A. Further, the first node 150 may determine that the knowledge validation score 168A is above a predetermined threshold.

The process 400 continues at operation 210, where the first node 150 determines whether the first node 150 is configured to provide a second response corresponding to the second knowledge domain. If the first node 150 can provide a response corresponding to the second knowledge domain (i.e., YES), the process 200 proceeds to operation 212. At operation 212, the first node 150 provides the first response and the second response to the response aggregator 140. As described above, the response aggregator 140 may be incorporated into the server 108. The first response and the second response may be the responses 112 provided from the decentralized network 102 to the server 108.

If the first node 150 cannot provide a response corresponding to the second knowledge domain (i.e., NO), the process 200 proceeds to operation 214. At operation 214, the first node 150 communicates the second sub-request 130B to a second node 152 of the multiple nodes 150-158. The second node 152 may be configured to provide the second response corresponding to the second knowledge domain. To determine that the second node 152 is configured to respond to the second sub-request 130B, the second node 152 may determine that the second knowledge domain is included in the second knowledge domain information 166B. Further, the first node 152 may determine that the knowledge validation score 168B is above a second predetermined threshold. The second predetermined threshold may be similar or equal to the first predetermined threshold.

At operation 216, the first node 150 provides the first response to a response aggregator. The first node 150 provides the first response to the response aggregator 140. The first response may be one of the responses 112 provided from the decentralized network 102 to the server 108.

At operation 218, the second node 152 provides the second response to the response aggregator. The second node 152 provides the second response to the response aggregator 140. The second response may be one of the responses 112 provided from the decentralized network 102 to the server 108.

At operation 220, the response aggregator 140 relates the first response and the second response to the request identifier (i.e., the request ID 142A) associated with the service request 104A. In this regard, the response aggregator 140 may compile responses 112 that are associated with the sub-request 130A and the sub-request 130B. These first compiled responses 112A may be all related via the request ID 142A.

The process 200 ends at operation 222, the server 108 outputs the first response and the second response to a user device in conjunction with the request identifier (i.e., the request ID 142A) associated with the service request 104A. The first response and the second response may be provided to the user device 106 in the form of a single service request response 110 in the manner described in reference to FIG. 1.

Example Process to Select Knowledge-Specific Nodes

FIG. 3 illustrates an example flowchart of a process 300 to select decentralized network nodes configured to provide knowledge-specific responses in accordance to one or more embodiments.

The process 300 starts at operation 302, where a first sub-request 130A is received at a first node 150 of multiple nodes 150-158 in the decentralized network 102. In this example, the server 108 receives the first service request 104 and parses the first sub-request 130A in the first service request 104. The first node 150 may receive the first sub-request 130A from the server 108. As described above, to determine that the first node 150 is configured to respond to the first sub-request 130A, the first node 150 may determine that the first knowledge domain is included in the first knowledge domain information 166A. Further, the first node 150 may determine that the knowledge validation score 168A is above a first predetermined threshold.

The process 300 continues at operation 304, where the first node 150 determines whether the first node 150 comprises a first score (i.e., the knowledge validation score 168A) indicating that the first node 150 is configured to provide a first response corresponding to a first knowledge domain. If the first node 150 can provide a response corresponding to the first knowledge domain (i.e., YES), the process 300 proceeds to operation 306. At operation 306, the first node 150 determines whether the first node 150 is at capacity (i.e., the first node 150 comprises available capacity). If the first node 150 is not at capacity (i.e., NO), the process 300 proceeds to operation 308. At operation 308, the first node 150 provides the first response to the response aggregator 140. As described above, the response aggregator 140 may be incorporated into the server 108. The first response and the second response may be the responses 112 provided from the decentralized network 102 to the server 108.

If the first node 150 cannot provide a response corresponding to the first knowledge domain at the operation 304 (i.e., NO), the process 300 proceeds to operation 310. Similarly, if the first node 150 is at capacity at the operation 306 (i.e., YES), the process 300 proceeds to operation 310. At operation 310, the first nodes 150 communicates the first sub-request 130A to a second node 152 of the multiple nodes 150-158. The second node 152 may be configured to provide a first response corresponding to the first knowledge domain. To determine that the second node 152 is configured to respond to the first sub-request 130A, the second node 152 may determine that the first knowledge domain is included in the second knowledge domain information 166B. Further, the second node 152 may determine that the knowledge validation score 168B is above a second predetermined threshold. The second predetermined threshold may be similar or equal to the first predetermined threshold.

The process 300 continues at operation 312, where the second node determines whether the second node is at capacity (i.e., the second node 152 comprises available capacity). If the second node 152 is not at capacity (i.e., NO), the process 300 proceeds to operation 314. At operation 314, the second node 152 provides the first response to the response aggregator 140.

If the second node 152 is at capacity (i.e., YES), the process 300 proceeds to operation 316. At operation 316, the second node 152 communicates the first sub-request 130A to a third node 154 of the multiple nodes 150-158. The third node 154 may be configured to provide the first response corresponding to the first knowledge domain. To determine that the third node 154 is configured to respond to the first sub-request 130A, the third node 154 may determine that the first knowledge domain is included in the third knowledge domain information 166C. Further, the third node 154 may determine that the knowledge validation score 168C is above a third predetermined threshold. The third predetermined threshold may be similar or equal to the first predetermined threshold and/or the second predetermined threshold.

At operation 318, the third node 154 determines that the third node 154 comprises capacity (i.e., the third node 154 comprises available capacity) to provide the first response. At operation 320, the third node 154 provides the first response to the response aggregator 140.

The process 300 continues at operation 322 from any one of the operation 308, the operation 314 or the operation 320. At operation 322, the response aggregator 140 relates the first response to a request (i.e., the request ID 142A) associated with the service request 104A. In this regard, the response aggregator 140 may compile the first response associated with the sub-request 130A.

The process 300 ends at operation 324, the server 108 output the first response to a user device 106 in conjunction with the request identifier (i.e., the request ID 142A) associated with the service request 104A. The first response may be provided to the user device 106 in the form of a single service request response 110 in the manner described in reference to FIG. 1.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
   a server comprising a server processor configured to:
      receive a service request to provide a plurality of responses associated with one or more knowledge domains;
      parse the service request into a first sub-request and a second sub-request;
      determine that the first sub-request is associated with a first knowledge domain and the second sub-request is associated with a second knowledge domain, the first knowledge domain being different from the second knowledge domain;
      assign a request identifier to the first sub-request and the second sub-request, wherein:
         the first sub-request is associated with the request identifier; and
         the second sub-request is associated with the request identifier; and
      transmit the first sub-request and the second sub-request to a first node in a decentralized network; and
   the decentralized network communicatively coupled to the server and comprising:
      the first node comprising a first processor configured to:
         receive the first sub-request associated with the first knowledge domain and the second sub-request associated with the second knowledge domain;
         determine that the first node is configured to provide a first response to the first sub-request associated with the first knowledge domain;
         determine that the first node is not configured to provide a second response to the second sub-request associated with the second knowledge domain;
         identify a second node in the decentralized network configured to provide the second response to the second sub-request associated with the second knowledge domain;
         generate the first response to the first sub-request associated with the first knowledge domain;
         associate the first response with the request identifier;
         provide, to the server, the first response to the first sub-request associated with the first knowledge domain; and
         transmit the second sub-request to the second node; and
      the second node comprising a second processor configured to:
         receive the second sub-request from the first node;
         determine that the second node is configured to provide the second response to the second sub-request associated with the second knowledge domain;
         generate the second response to the second sub-request associated with the second knowledge domain;
         associate the second response with the request identifier; and
         provide, to the server, the second response to the second sub-request associated with the second knowledge domain,
      wherein the server is further configured to:
         receive the first response to the first sub-request associated with the first knowledge domain from the first node;
         receive the second response to the second sub-request associated with the second knowledge domain from the second node;
         aggregate the first response and the second response as the plurality of responses to the service request based on the request identifier, the plurality of responses comprising the first response to the first sub-request associated with the first knowledge domain in a first place position and the second response to the second sub-request associated with the second knowledge domain in a second place position; and
output the plurality of responses to a user device.

2. The system of claim 1, wherein the first node is further configured to:
in conjunction with receiving the first sub-request and the second sub-request at the first node, determine that the first node comprises a first score indicating that the first node is configured to provide the first response corresponding to the first knowledge domain;
identify that the first node is configured to provide the first response corresponding to the first knowledge domain; and
determine that the first node comprises available capacity to provide the first response corresponding to the first knowledge domain.

3. The system of claim 1, wherein the decentralized network further comprises a third node configured to provide one or more additional responses corresponding to a third knowledge domain and a fourth knowledge domain, the third knowledge domain being different from the fourth knowledge domain.

4. The system of claim 3, wherein:
the third node comprises a third processor configured to:
receive a third sub-request associated with the third knowledge domain and a fourth sub-request with the fourth knowledge domain;
determine that the third node is configured to provide a third response to the third knowledge domain and a fourth response to the fourth knowledge domain; and
provide the third response corresponding to the third knowledge domain and the fourth response corresponding to the fourth knowledge domain to the server; and
the server is further configured to:
receive an additional service request to provide an additional plurality of responses associated with the third knowledge domain and the fourth knowledge domain, the additional service request comprising the third sub-request and the fourth sub-request;
parse, in the additional service request, the third sub-request associated with the third knowledge domain and the fourth sub-request associated with the fourth knowledge domain;
assign an additional request identifier to the third sub-request and the fourth sub-request;
transmit the third sub-request and the fourth sub-request to the third node in the decentralized network;
receive the third response from the third node, the third response indicating the additional request identifier;
receive the fourth response from the third node, the fourth response indicating the additional request identifier;
aggregate the third response and the fourth response as the additional plurality of responses to the additional service request based on the additional request identifier associated with additional the service request; and
output the additional plurality of responses to the user device.

5. The system of claim 1, further comprising:
one or more service databases configured to provide a plurality of knowledge and policy changes to the first node and the second node in the decentralized network.

6. The system of claim 1, wherein the decentralized network is a peer-to-peer decentralized network.

7. A method, comprising:
receiving, by a server, a service request to provide a plurality of responses associated with one or more knowledge domains;
parsing the service request into a first sub-request and a second sub-request;
determining that the first sub-request is associated with a first knowledge domain and the second sub-request is associated with a second knowledge domain, the first knowledge domain being different from the second knowledge domain;
assigning, by the server, a request identifier to the first sub-request and the second sub-request, wherein:
the first sub-request is associated with the request identifier; and
the second sub-request is associated with the request identifier;
communicating, by the server, the first sub-request associated with the first knowledge domain and the second sub-request associated with the second knowledge domain to a decentralized network comprising a plurality of nodes;
receiving the first sub-request and the second sub-request at a first node of the plurality of nodes;
determining, by the first node, that the first node is configured to provide a first response to the first sub-request associated with the first knowledge domain;
identifying, by the first node, a second node in the decentralized network configured to provide a second response to the second sub-request associated with the second knowledge domain;
generating the first response to the first sub-request associated with the first knowledge domain, the first response indicating the request identifier;
providing, by the first node to the server, the first response to the first sub-request associated with the first knowledge domain;
communicating, by the first node, the second sub-request associated with the second knowledge domain to the second node of the plurality of nodes;
receiving, by the second node, the second sub-request associated with the second knowledge domain from the first node;
determining, by the second node, that the second node is configured to provide the second response to the second sub-request associated with the second knowledge domain;
generating, by the second node, the second response to the second sub-request associated with the second knowledge domain;
associating the second response with the request identifier;
providing, by the second node, the second response to the second sub-request associated with the second knowledge domain to the server;
receiving, by the server, the first response to the first sub-request associated with the first knowledge domain from the first node;
receiving, by the server, the second response to the second sub-request associated with the second knowledge domain from the second node;
aggregating, by the server, the first response and the second response as the plurality of responses to the service request based on the request identifier, the plurality of responses comprising the first response to the first sub-request associated with the first knowledge domain in a first place position and the second response to the second sub-request associated with the second knowledge domain in a second place position; and outputting the plurality of responses to a user device.

8. The method of claim 7, further comprising:

in conjunction with receiving the first sub-request and the second sub-request at the first node, determining that the first node comprises a first score indicating that the first node is configured to provide the first response corresponding to the first knowledge domain;

identifying, by the first node, that the first node is configured to provide the first response corresponding to the first knowledge domain; and determining that the first node comprises available capacity to provide the first response corresponding to the first knowledge domain.

9. The method of claim 7, further comprising:

receiving, by the server, an additional service request to provide an additional plurality of responses associated with a third knowledge domain and a fourth knowledge domain, the additional service request comprising a third sub-request and a fourth sub-request;

parsing, by the server, an additional plurality of sub-requests in the service request, wherein the third sub-request associated with the third knowledge domain and the fourth sub-request associated with the fourth knowledge domain;

assigning, by the server, an additional request identifier to the third sub-request and the fourth sub-request;

communicating, by the server, the third sub-request associated with the third knowledge domain and the fourth sub-request associated with the fourth knowledge domain to a third node of the plurality of nodes in the decentralized network;

receiving the third sub-request and the fourth sub-request at the third node of the plurality of nodes, the third knowledge domain being different from the fourth knowledge domain;

determining, by the third node, that the third node is configured to provide a third response to the third knowledge domain and a fourth response to the fourth knowledge domain;

providing, by the third node, the third response and the fourth response to the server;

aggregating, by the server, the third response and the fourth response as the additional plurality of responses to the additional service request based on the additional request identifier; and outputting the additional plurality of responses to the user device.

10. The method of claim 9, further comprising:

in conjunction with communicating the third sub-request and the fourth sub-request to the third node of the plurality of nodes, determining that the third node comprises available capacity to provide the third response corresponding to the third knowledge domain and the fourth response corresponding to the fourth knowledge domain.

11. The method of claim 7, further comprising:

receiving, by the server, an additional service request to provide an additional plurality of responses associated with a third knowledge domain, the additional service request comprising a third sub-request and a fourth sub-request;

parsing, by the server, an additional plurality of sub-requests in the service request, wherein the third sub-request associated with the third knowledge domain and the fourth sub-request associated with a fourth knowledge domain;

assigning, by the server, an additional request identifier to the third sub-request and the fourth sub-request;

communicating, by the server, the third sub-request associated with the third knowledge domain and the fourth sub-request associated with the fourth knowledge domain to a third node of the plurality of nodes in the decentralized network;

receiving the third sub-request and the fourth sub-request at the third node of the plurality of nodes, the third knowledge domain being different from the fourth knowledge domain;

determining that the third node lacks available capacity to provide a third response corresponding to the third knowledge domain and a fourth response corresponding to the fourth knowledge domain;

communicating, by the third node, the third sub-request and the fourth response to a fourth node of the plurality of nodes, wherein the fourth node is configured to provide the third response corresponding to the third knowledge domain and the fourth response corresponding to the fourth knowledge domain;

determining that the fourth node comprises the available capacity to provide the third response corresponding to the third knowledge domain and the fourth response corresponding to the fourth knowledge domain;

providing, by the fourth node, the third response and the fourth response to the server;

aggregating, by the server, the third response and the fourth response as the additional plurality of responses to the additional service request based on the additional request identifier; and outputting the additional plurality of responses to the user device.

12. The method of claim 7, further comprising:

providing, by one or more service databases, a plurality of knowledge and policy changes to the plurality of nodes in the decentralized network.

13. The method of claim 7, further comprising:

receiving, by the server, a request score from the user device, the request score indicating a first perceived knowledge capacity of the first node about the first knowledge domain and a second perceived knowledge capacity of the second node about the second knowledge domain;

updating, by the server, a node-specific score information associated with the first node and the second node based at least in part upon the request score, wherein the node-specific score information comprises a first node score associated with the first node and a second node score associated with the second node; and retiring the first node in response to the first node score being a low-scoring node.

14. The method of claim 7, wherein the decentralized network is a peer-to-peer decentralized network.

15. A non-transitory computer-readable medium storing instructions that when executed by at least one processor cause the at least one processor to:

receive, at a server, a service request to provide a plurality of responses associated with one or more knowledge domains;

parse the service request into a first sub-request and a second sub-request;

determine, at the server, that the first sub-request is associated with a first knowledge domain and the second sub-request is associated with a second knowledge domain, the first knowledge domain being different from the second knowledge domain;

assign, at the server, a request identifier to the first sub-request and the second sub-request, wherein:
  the first sub-request is associated with the request identifier; and
  the second sub-request is associated with the request identifier;

communicate, from the server, the first sub-request associated with the first knowledge domain and the second sub-request associated with the second knowledge domain to a decentralized network comprising a plurality of nodes;

receive the first sub-request and the second sub-request at a first node of the plurality of nodes;

determine, at the first node, that the first node is configured to provide a first response to the first sub-request associated with the first knowledge domain;

identify, at the first node, a second node in the decentralized network configured to provide a second response to the second sub-request associated with the second knowledge domain;

generate, at the first node, the first response to the first sub-request associated with the first knowledge domain, the first response indicating the request identifier;

provide, from the first node to the server, the first response to the first sub-request associated with the first knowledge domain;

communicate, from the first node, the second sub-request associated with the second knowledge domain to the second node of the plurality of nodes;

receive, at the second node, the second sub-request associated with the second knowledge domain from the first node;

determine, at the second node, that the second node is configured to provide the second response to the second sub-request associated with the second knowledge domain;

generate, at the second node, the second response to the second sub-request associated with the second knowledge domain;

associate the second response with the request identifier;

provide, from the second node, the second response to the second sub-request associated with the second knowledge domain to the server;

receiving, at the server, the first response to the first sub-request associated with the first knowledge domain from the first node;

receiving, at the server, the second response to the second sub-request associated with the second knowledge domain from the second node;

aggregate, at the server, the first response and the second response as the plurality of responses to the service request based on the request identifier, the plurality of responses comprising the first response to the first sub-request associated with the first knowledge domain in a first place position and the second response to the second sub-request associated with the second knowledge domain in a second place position; and output, at the server, the plurality of responses to a user device.

16. The non-transitory computer-readable medium of claim 15, wherein the instructions further cause the at least one processor to:

in conjunction with receiving the first sub-request and the second sub-request at the first node, determine that the first node comprises a first score indicating that the first node is configured to provide the first response corresponding to the first knowledge domain;

identify, at the first node, that the first node is configured to provide the first response corresponding to the first knowledge domain; and determine that the first node comprises available capacity to provide the first response corresponding to the first knowledge domain.

17. The non-transitory computer-readable medium of claim 15, wherein the instructions further cause the at least one processor to:

receive, at the server, an additional service request to provide an additional plurality of responses associated with a third knowledge domain and a fourth knowledge domain, the additional service request comprising a third sub-request and a fourth sub-request;

parse, at the server, an additional plurality of sub-requests in the service request, wherein the third sub-request associated with the third knowledge domain and the fourth sub-request associated with the fourth knowledge domain;

assign, at the server, an additional request identifier to the third sub-request and the fourth sub-request;

communicate, at the server, the third sub-request associated with the third knowledge domain and the fourth sub-request associated with the fourth knowledge domain to a third node of the plurality of nodes in;

receive the third sub-request and the fourth sub-request at the third node of the plurality of nodes, the third knowledge domain being different from the fourth knowledge domain;

determine, at the third node, that the third node is configured to provide a third response to the third knowledge domain and a fourth response to the fourth knowledge domain;

determine that the third node lacks available capacity to provide the third response corresponding to the third knowledge domain and the fourth response corresponding to the fourth knowledge domain;

communicate, at the third node, the third sub-request and the fourth response to a fourth node of the plurality of nodes, wherein the fourth node is configured to provide the third response corresponding to the third knowledge domain and the fourth response corresponding to the fourth knowledge domain;

determine that the fourth node comprises available capacity to provide the third response corresponding to the third knowledge domain and the fourth response corresponding to the fourth knowledge domain;

provide, at the fourth node, the third response and the fourth response to the server;

aggregate, at the server, the third response and the fourth response as the additional plurality of responses to the additional service request based on the additional request identifier associated with the service request; and output the additional plurality of responses to the user device.

18. The non-transitory computer-readable medium of claim 15, wherein the instructions further cause the at least one processor to:

provide, at one or more service databases, a plurality of knowledge and policy changes to the plurality of nodes in the decentralized network.

19. The non-transitory computer-readable medium of claim 15, wherein the instructions further cause the at least one processor to:

receive, at the server, a request score from the user device, the request score indicating a first perceived knowledge capacity of the first node about the first knowledge domain and a second perceived knowledge capacity of the second node about the second knowledge domain;

update, at the server, a node-specific score information associated with the first node and the second node based at least in part upon the request score, wherein the node-specific score information comprises a first node score associated with the first node and a second node score associated with the second node; and retire the first node in response to the first node score being a low-scoring node.

20. The non-transitory computer-readable medium of claim 15, wherein the decentralized network is a peer-to-peer decentralized network.

\* \* \* \* \*